Nov. 19, 1940.   R. WINTZER   2,222,550
VALVE
Filed May 4, 1936
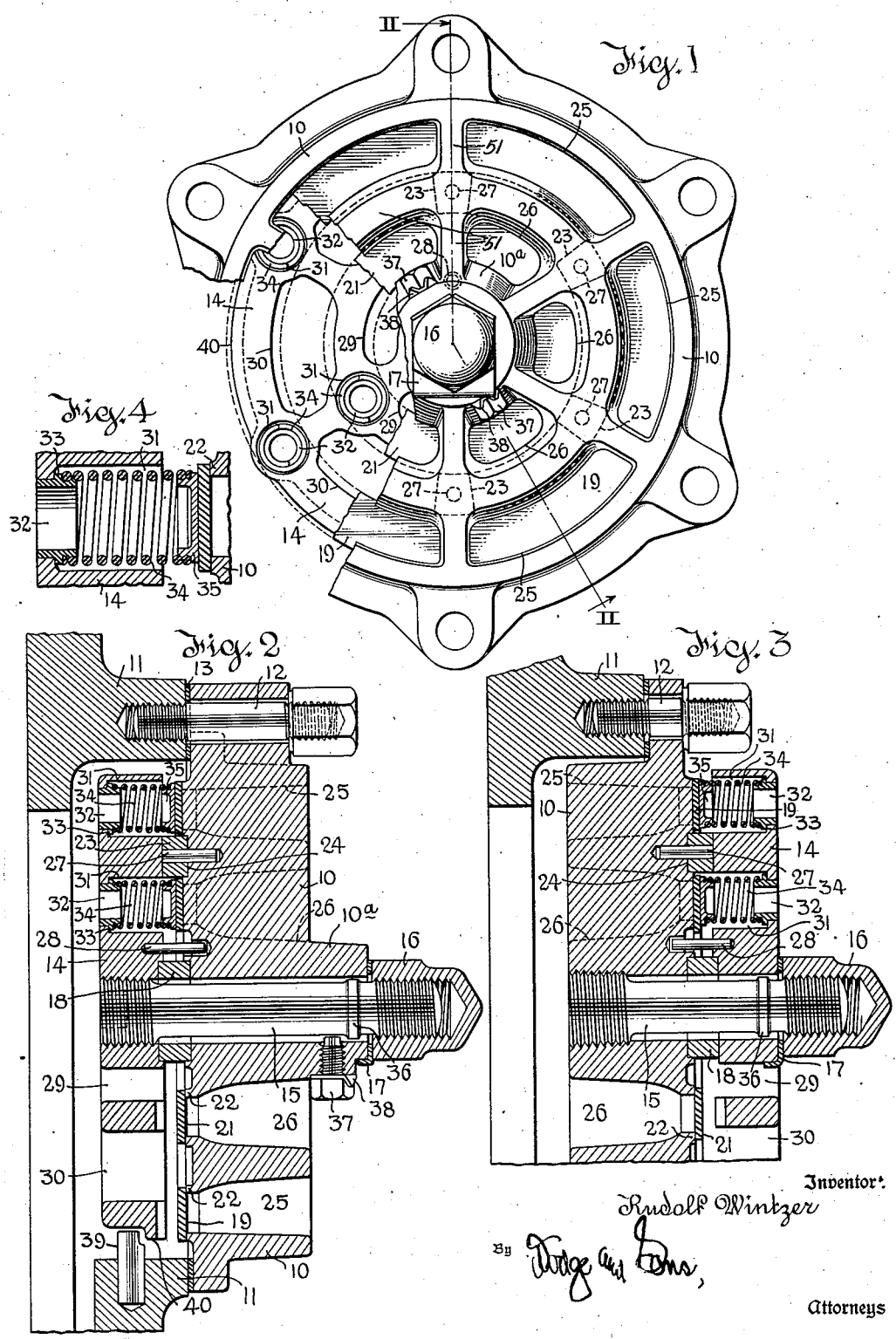
Inventor:
Rudolf Wintzer
By Dodge and Sons,
Attorneys Patented Nov. 19, 1940

2,222,550

UNITED STATES PATENT OFFICE 2,222,550

VALVE

Rudolf Wintzer, Milwaukee, Wis., assignor to Nordberg Manufacturing Company, Milwaukee, Wis., a corporation of Wisconsin Application May 4, 1936, Serial No. 77,838

4 Claims. (Cl. 277—60)

The present invention pertains to valves, and relates more particularly to a novel structure especially applicable for use in conjunction with gas compressors.

The structure as hereinafter set forth in detail has been found highly efficient where the gas being compressed carries impurities which tend to stick to the valve surfaces and seats, and the valve actuating springs, if the latter be employed.

Moreover, while the arrangement of the component elements of the structure is relatively simple, the valves are properly guided in their movement toward and from their seats. A large valve area is also produced and the valves may be operated at high velocity. Furthermore, the structure is such that no pockets are formed in the valve seat element nor in the guard element in which impurities carried by the gas would tend to collect.

With the foregoing and other advantages, as will hereinafter appear, reference will be had to the annexed drawing, wherein:

Figure 1 is a face view of the valve body of a suction valve as seen from the outside, with parts broken away;

Fig. 2, a transverse sectional view taken on the line II—II of Fig. 1;

Fig. 3, a similar view of an embodiment of the present invention functioning as a discharge valve; and Fig. 4, a detailed sectional view of the valve closing spring and allied parts.

Referring first to Figs. 1, 2 and 4, 10 denotes the valve seat, which is shown as secured to a flange 11 forming a portion of a compressor cylinder, as by stud bolts 12. A suitable gasket 13 is interposed between said seat portion in order to effect a tight joint between said flange and the seat.

The seat, as will be noted, overlies a valve guard or element 14 provided with a central threaded opening into which extends a bolt 15, the upper end whereof is threaded for the reception of a cap-nut 16, said nut preferably having associated therewith a lock washer as 17, interposed between it and the upper face of a boss 10ᵃ formed upon the body 10. A distance washer or ring 18 through which the bolt freely passes, is placed between the valve seat element and the guard 14, said member being seated in recesses formed in the opposing faces of said members 10 and 14. The turning up of the nut 16 necessarily brings the parts 10 and 14 against the washer and valve guide elements hereinafter referred to and holds said parts in proper relationship to each other. The washer is of such thickness as to hold the members 10 and 14 the required distance from each other, so that a space or passage is formed for the flow of the incoming gases therebetween when the valves are unseated.

The valves, two of which are shown, are of annular form, being produced from flat sheet stock and are designated by 19 and 21, respectively.

It may be well to note at this point that the valves are imperforate and, hence, no opening or notch is present which would tend to produce an initial line of fracture, or, in other words, an initial point from which a fracture might start across the valve body.

These valves are held in proper position with reference to their raised seats 22 which, as will be seen upon reference to Fig. 2, are narrow, by guide blocks 23, said blocks being trapezoidal in plan (see Fig. 1) and filleted at the corners to do away with any sharp projections. Each of these blocks is seated in a recess 24 produced in the face of the valve body 10 intermediate the two series of ports or openings 25 and 26, respectively, which latter are preferably nozzle-shape in cross section. These openings extend through the seat casting and terminate in the raised seats 22 heretofore referred to. Necessarily, by reason of the position of the ports, ribs as 51 are produced, said ribs being disposed in staggered relation to the ports, as clearly shown in the drawing.

The blocks are held in their proper spaced relation with reference to each other and the valves which they guide, by pins or stakes 27 which extend up through said blocks and into openings formed in the valve seat casting 10. The guide blocks 23 lie between the proximate edges of the valves 19 and 21, and said blocks, in conjunction with the distance washer 18, assure the proper spacing of the valve seat member 10 and the valve guard 14.

An assembly dowel 28 is driven into the body of the valve guard 14 and extends outwardly into an opening formed in the seat casting 10. This facilitates positioning of the parts with reference to each other prior to the tightening up of the cap-nut 16. The ring valves 19 and 21 and the springs for seating the same, together with the parts about to be described are, of course, positioned prior to the assembly of the seat casting and the guard 14.

Under certain conditions, springs for the valves are not essential, but it is preferred to employ the same. In the instant case, the guard 14, which is spaced away from the seat casting 10 by the distance washer 18, is formed with two series of concentrically arranged ports 29 and 30. Where springs are employed, they will preferably be mounted in the following manner, and inasmuch as the parts are alike throughout, the same reference numerals will appear on all of them.

It should be borne in mind that inasmuch as the outer valve 19 is of greater diameter than the inner valve 21, a larger number of springs will be employed therewith than will be employed with the inner valve. A series of sockets or openings 31 will be formed in the valve guard 14 in line with each valve and seated therein is a bushing 32, open at each end. Said bushing has an outwardly extending flange 33 which holds the bushing within the opening and, likewise, forms a seat for the lower end of a coil spring 34 (see Fig. 4). Each end convolution of the spring is ground off parallel and square with the center line of the spring, hence the lower or inner end of the spring will have a fair bearing upon the shouldered portion 33. The upper end of the spring is designed to embrace a flange upon a shoe 35, the outer face of which bears against the adjacent face of the valve. The convolutions of the spring are such that they will make a tight fit with the bushing and the shoe. This arrangement insures that the spring may operate with the center line horizontal, or at right angles to the axis of the spring, without any danger of its slipping from the bushing or shoe.

When the spring is entirely compressed, that is when the valve is wide open, its length is so chosen that the various convolutions may come together coil upon coil, which has a tendency to squeeze from between such coils any of the entrained viscous impurities in the gas which may have collected upon the coils. This arrangement also prevents the coils from vibrating and the spring shoe from leaving the valve at the moment the valve impinges the valve guard in its wide open position. This has the effect of materially increasing the life of the spring.

It is also apparent that as the spring approaches its condition where the coils are in contact, some of the coils will come into contact earlier than others, thereby very rapidly increasing the scale or stiffness of the spring which, furthermore, tends to retard the valve so that it impinges with the guard at a less velocity than it otherwise would. This adds to the life of the valve.

It is to be noted that the bushing 32 has a large opening extending throughout the same, so that the accumulation of matter entrained with the gas, as well as the gas, can readily find egress from the pocket or recess in which the spring is located. When acting upon certain gases, the construction above set forth in detail may be advantageous, but the invention is not to be limited to such an arrangement. Thus, it is not essential that the spring be made of such length that the convolutions will contact when the valve is wide open. In this case, the gas would, of course, pass between the convolutions of the spring at all points in the suction stroke of the compressor.

The ports 29 and 30 and the open ended bushing 32 ensure maximum area for the indrawn gas.

In structures of the present type, the larger parts are sometimes subject to breakage and to prevent the parts from being drawn into the cylinder, the following or similar means may be employed. As will be seen upon reference to Fig. 2, the center bolt 15 is formed with an annular shoulder 36 adjacent its outer end. Mounted in the boss 10ª are set screws 37 (see Figs. 1 and 2), the inner ends whereof extend into the opening formed in the boss 10ª and inward of the shoulder 36. Suitable lock washers 38 are preferably employed in conjunction with the set screws.

To the same end, a plurality of stakes as 39, only one of which is shown (see Fig. 2), will preferably be mounted in the flange 11, the inner ends of the stakes being positioned inwardly of a flange 40 formed upon the valve guard 14. The set screws 37 will not contact the body of the bolt 15 nor will the inner ends of the stakes 39 contact the valve guard 14 when the parts are in normal condition. Thus, they will not interfere with the proper positioning of the other elements with reference to each other as they are finally drawn to place.

The description so far given applies to a valve arrangement to be used upon the suction end of a compressor. In Fig. 3, the same structure is shown in the reverse position for utilization upon the discharge end of the compressor. The parts are identical throughout and are similarly lettered, they being merely reversed, owing to the difference in the direction of flow of the gas.

It will be appreciated, of course, that the valves will operate either in horizontal or vertical position.

The present valve structure, moreover, has been found to operate with a high degree of success in the handling of gases carrying viscous or sticky impurities which tend to adhere to the valve surfaces, making the operation of the ordinary valve difficult.

With the present structure, a quantity of water or weak solution of soda may be sprayed into the cylinder or into the suction passages, which loosens the accumulation of such impurities and allows the same to be washed off and passed through the valve. The valve of the present invention has been found to operate satisfactorily under these conditions, namely where it is required to handle a mixture of gas and liquid.

When water is passed through the valve or it becomes necessary to introduce wash water as above indicated, it is preferable and in fact quite desirable to produce the guiding blocks 23 from non-metallic material such as lignum-vitae or carbon. These materials will withstand water lubrication and not act to unduly wear the valve edges. Consequently, no notches are formed in the valve edges and the valves are free to shift their position with reference to the seats and the guide blocks. Hence, wear upon the valves with reference to the seats is not localized.

It is recognized by those skilled in the art that it is an advantage to secure as great a valve area as possible in compressors, and the valve herein shown and described answers this requirement, and, likewise, permits of operation at high velocity.

While two annular valves are shown, the structure lends itself to the employment of one valve alone, or to three or more.

What is claimed is:

1. A valve structure, comprising in combination a valve seat section adapted to be secured to the flange of a cylinder head or the like, said section having an outwardly extending boss located centrally thereof and likewise having an opening extending through said boss and the body of the section; a valve guard section; a bolt connected at its inner end to said guard, said bolt extending upwardly through the opening in the valve seat free of contact therewith and having a flange adjacent its outer end; a nut mounted upon the outer threaded end of said bolt and acting to draw the valve seat section and the valve guard together; at least one set screw mounted in the boss and projecting into the opening therein at a point inwardly of the shoulder formed by the flange upon the bolt; and at least one valve mounted between the sections aforesaid.

2. In a valve mechanism for gas pumps or compressors, the combination of a seat element and a cage element, the seat element being provided with at least one circular port and the cage element having apertures which overlie the port in the seat element; means for connecting said elements together in spaced relation; at least one ring plate valve adapted to close the port in said seat element, said plate valve having narrow peripheral areas of seating engagement with the seat element, the plate valve being capable of individual free rotation about its axis relatively to the seat element; a series of spring assemblies reacting between the cage and valve, each such assembly comprising a coil compression spring, a spring seat associated with the cage element and having a through port leading through the cage element from the interior of the spring, and a shoe carried by an end of the spring, said shoe being in thrust engagement with the valve but so formed as to permit rotary shifting of the valve relatively thereto; a plurality of non-metallic guide blocks mounted in recesses formed to confine them in said seat element, said guide blocks being in edge contact with said annular valve to center the same in relation with the port while permitting rotation of the valve relatively to the port; and dowels entering corresponding blocks and one of said elements and serving to maintain the alignment of said blocks.

3. In a valve mechanism for gas pumps or compressors, the combination of a seat element and a cage element, the seat element being provided with two concentric circular ports and the cage element having apertures which overlie such ports in the seat element; means for connecting said elements together in spaced relation; two independent ring plate valves each adapted to close a corresponding one of the ports in said seat element, said plate valves having narrow peripheral areas of seating engagement with the seat element and the plate valves being capable of individual free rotation about their axes relatively to the seat element; two series of spring assemblies, one series for each valve, said assemblies reacting between the cage and the corresponding valve and each such assembly comprising a coil compression spring, a spring seat associated with the cage element and having a through port leading through the cage element from the interior of the spring, a shoe carried by an end of the spring, said shoe being in thrust engagement with the valve but so formed as to permit rotary shifting of the valve relatively thereto; and removable post-like guiding elements confined and held against movement between the seat element and the cage element in circular arrangement between said ring valves, the outer valve being centered by engagement of its inner edge with said guiding elements and the inner valve being centered by engagement of its outer edge with said guiding elements.

4. A structure as set forth in claim 1, in combination with a support for said seat section, and a fixed post extending inwardly from said support toward the periphery of the valve guard section and past a flange formed thereon, said post being normally out of contact with the guard.

RUDOLF WINTZER.